US005150823A

United States Patent [19]

Sugita

[11] Patent Number: 5,150,823

[45] Date of Patent: Sep. 29, 1992

[54] COMBINATION CONTAINER AND PUMP HAVING A CONICAL PISTON FOR VENTING

[75] Inventor: Koichi Sugita, Chiba, Japan

[73] Assignee: Kabushiki Kaisha Top, Tokyo, Japan

[21] Appl. No.: 603,618

[22] Filed: Oct. 26, 1990

[30] Foreign Application Priority Data

| | | | |
|---|---|---|---|
| Oct. 31, 1989 | [JP] | Japan | 1-127661[U] |
| Dec. 26, 1989 | [JP] | Japan | 1-149857[U] |
| Dec. 26, 1989 | [JP] | Japan | 1-149858[U] |

[51] Int. Cl.[5] ............ G01F 11/00

[52] U.S. Cl. ............ 222/386; 222/257

[58] Field of Search ............ 222/386, 386.5, 389, 222/256-257; 604/125; 92/181 P

[56] References Cited

U.S. PATENT DOCUMENTS

| | | | |
|---|---|---|---|
| 3,367,545 | 2/1968 | Cook | 222/389 |
| 4,023,717 | 5/1977 | Schultz | 222/389 X |
| 4,045,938 | 9/1977 | Hansen | 222/389 X |
| 4,134,523 | 1/1979 | Hansen et al. | 222/389 |
| 4,641,765 | 2/1987 | Diamond | 222/389 X |
| 4,645,098 | 2/1987 | Hoffmann | 222/386 |
| 4,657,161 | 4/1987 | Endo et al. | 222/386 X |
| 4,694,977 | 9/1987 | Graf et al. | 222/386 X |
| 4,773,900 | 9/1988 | Cochran | 222/389 X |
| 4,792,065 | 12/1988 | Soehnlein et al. | 222/386 X |
| 4,819,836 | 4/1989 | Meckenstock | 222/386 |
| 4,951,848 | 8/1990 | Keller | 222/386 |

FOREIGN PATENT DOCUMENTS

| | | | |
|---|---|---|---|
| 3435576 | 4/1986 | Fed. Rep. of Germany | 222/386 |
| 351517 | 1/1990 | Italy | 222/386 |
| 263668 | 11/1986 | Japan . | |
| 88/09483 | 12/1988 | World Int. Prop. O. . | |

*Primary Examiner*—Michael S. Huppert
*Assistant Examiner*—Kenneth DeRosa

[57] ABSTRACT

A pump is mounted in one end of a cylindrical container for storing a liquid, for drawing the liquid stored in the cylindrical container and discharging the drawn liquid out of the cylindrical container. A piston is slidably disposed in the opposite end of the container in keeping the liquid sealed in the cylindrical container. The piston is movable toward the pump as the amount of the liquid stored in the cylindrical container is reduced when the liquid is discharged from the cylindrical container by the pump. The piston has a slanted surface facing the pump for contact with the liquid stored in the cylindrical container, the slanted surface being inclined progressively toward the second axial end. The piston also has a cylindrical surface defining a communication hole defined axially therethrough and having an inner end opening at the slanted surface. The communication hole provides communication between the interior and the exterior of the cylindrical container. A cap comprises a cap body inserted in the communication hole and a flange closes an outer end of the communication hole. At least either one of the cap body and the cylindrical surface has at least one axial groove. Air bubbles which may have been trapped in the container when the liquid is charged into the container move along slanted surface into the communication hole and then is escaped from the container through the groove.

5 Claims, 8 Drawing Sheets

COMBINATION CONTAINER AND PUMP HAVING A CONICAL PISTON FOR VENTING

BACKGROUND OF THE INVENTION

1. Field of the Invention

The present invention relates to a combination container and pump, i.e., a pump assembly having a container for storing a liquid such as a chemical solution and air in an isolated relationship, and a pump for discharging the liquid from the container when required.

2. Description of Background Art

FIG. 8 of the accompanying drawings shows a conventional combination container and pump.

As shown in FIG. 8, the conventional combination container and pump, generally denoted at B, comprises a container a, a pump b, and a piston c slidably disposed in the container a. The interior of the container a is sealed by the pump b at the top thereof and the piston c at the bottom d thereof.

The pump b is of the type generally referred to as an airless pump, as disclosed in Japanese Laid-Open Patent Publication No. 61(1986)-263668. When a depressing member e of the pump b is depressed, the pump b operates to draw a stored liquid X from the container a and discharge the liquid X out of the container a.

More specifically, the liquid X filled in the container a is discharged out of the container a by the pump b when the depressing member e in the upper portion of the pump b is depressed with a finger. When the X egresses out of the container a, the amount of the liquid X stored in the container a is reduced, allowing the piston c to move upwardly in the direction indicated by the arrow in FIG. 8 while a pressing lip f of the piston c is being pressed against the inner wall surface of the container a in a sealing relationship. Since the liquid X filled in the container a is not exposed to ambient air, it can be stored in an isolated condition.

The combination container and pump B may be filled with the liquid X as follows: The pump b is first mounted in the container a. Thereafter, in a vacuum, the liquid X is introduced into the container a through the open bottom d while the bottom d is being directed upwardly. Then, the piston c is inserted into the bottom d, sealing the container a. This filling process, however, requires a large complex filling apparatus.

Alternatively, the piston c may first be inserted into the bottom d and then the liquid X may be introduced into the container a through the top thereof, after which the pump b may be mounted in the top of the container a. One problem of this filling procedure is that air may be trapped in the container a when the pump b is inserted after the liquid X has been filled.

Air bubbles which have been included in the liquid X filled in the container a are responsible for oxidation of the liquid X in the container a and contamination of the filled liquid X with microorganisms contained in the air. To avoid such drawbacks, therefore, it has been necessary to replace any air trapped when the liquid X is filled in the container a, with nitrogen.

The pressing lip f extends fully around the upper circumference of the piston c. The pressing lip f is pressed against the inner wall surface of the container a, thereby sealingly retaining the liquid X in the container a. The piston c is made of a relatively hard synthetic resin such as polyethylene or the like. Since the piston c is slidable in the container a while sealing the interior of the container a, the pressing lip f is required to be relatively thin so that it is given a suitable degree of resiliency.

However, the thin pressing lip f made of a synthetic resin, e.g., polyethylene, cannot easily be shaped to a configuration which keeps the interior of the container a suitably sealed. The thin pressing lip f is usually not shaped with high accuracy. Moreover, the thin pressing lip f tends to be deformed as the temperature changes. The pressing lip f thus deformed allows the liquid X to leak from the container a past the piston c.

SUMMARY OF THE INVENTION

In view of the aforesaid shortcomings of the conventional combination container and pump, it is an object of the present invention to provide a combination container and pump which can hold a liquid such as a chemical solution in a reliably sealed fashion and also prevent air from being trapped in the liquid when it is filled and sealed in the container.

To achieve the above object, there is provided in accordance with the present invention a combination container and pump comprising a cylindrical container for storing a liquid, the cylindrical container having first and second axial ends, a pump mounted in the first axial end, for drawing the liquid stored in the cylindrical container and discharging the drawn liquid out of the cylindrical container. A piston is slidably disposed in the second axial end for keeping the liquid sealed in the cylindrical container. The piston is movable toward the pump as the amount of the liquid stored in the cylindrical container is reduced when the liquid is discharged from the cylindrical container by the pump. The piston includes a slanted surface facing the pump for contact with the liquid stored in the cylindrical container, the slanted surface being inclined progressively toward the second axial end. The piston also includes a cylindrical surface defining a communication hole defined axially therethrough and having an inner end opening at the slanted surface. The communication hole provides communication between the interior and the exterior of the cylindrical container. A cap includes a cap body inserted in the communication hole and a flange closing an outer end of the communication hole, at least either one of the cap body and the cylindrical surface includes at least one groove extending along the direction in which the cap body is inserted into the communication hole.

The liquid, such as a chemical solution, can be filled in the container as follows:

With the piston and the cap removed, the second axial end of the container is directed upwardly with the pump down, and the liquid is charged into the container through the communication hole. Thereafter, the piston is inserted into the second axial end.

Air bubbles which may have been trapped with the liquid in the container are guided along the slanted surface of the piston toward the communication hole. Thereafter, the cap is inserted into the communication hole. When the cap is inserted, the air bubbles in the communication hole are discharged out of the container through the grooves defined in the cap body or the cylindrical surface which defines the communication hole. The cap is fully inserted in the communication hole, thereby tightly sealing the outer end of the communication hole with the flange of the cap.

The slanted surface may extends fully or partly over an end thereof which faces the pump.

The piston is made of a soft resin such as synthetic rubber or natural rubber, and has an annular ridge extending fully circumferentially around the slanted surface, the annular ridge having an axially flat surface slidably held against an inner wall surface of the container.

The piston which is made of a soft resin is sufficiently resilient. The axially flat surface of the annular ridge of the piston allows the piston to be intimately and reliably held against the inner wall surface of the container.

Inasmuch as the annular ridge extends fully circumferentially around the slanted surface of the piston, the annular ridge tends to be easily elastically deformed radially inwardly due to the presence of the space defined by the slanted surface. Even if the flat surface of the annular ridge in contact with the inner wall surface of the container is relatively large, the piston can easily slide along the inner wall surface of the cylinder.

Furthermore, the slanted surface has a shape complementary to the shape of an inner surface of the first axial end of the cylindrical container. The communication hole includes a receiving region for receiving an inlet port of the pump therein.

Since the slanted surface is complementary in shape to the inner surface of the first axial end of the container, when the piston reaches the first axial end of the container, the slanted surface of the piston is substantially intimately held against the inner surface of the first axial end of the container. Therefore, almost the entire amount of the liquid stored in the container can be discharged from the container.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
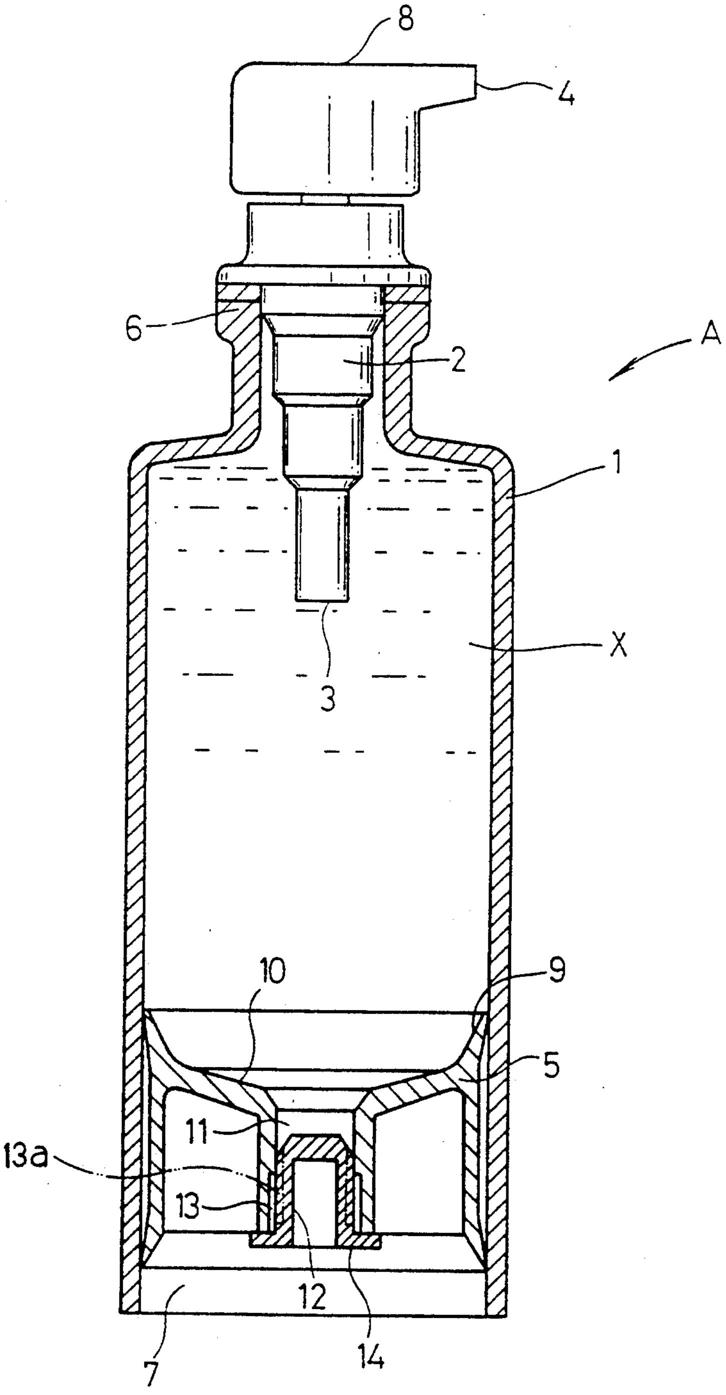
FIG. 1 is a cross-sectional view of a combination container and pump according to an embodiment of the present invention.
Figure 2:
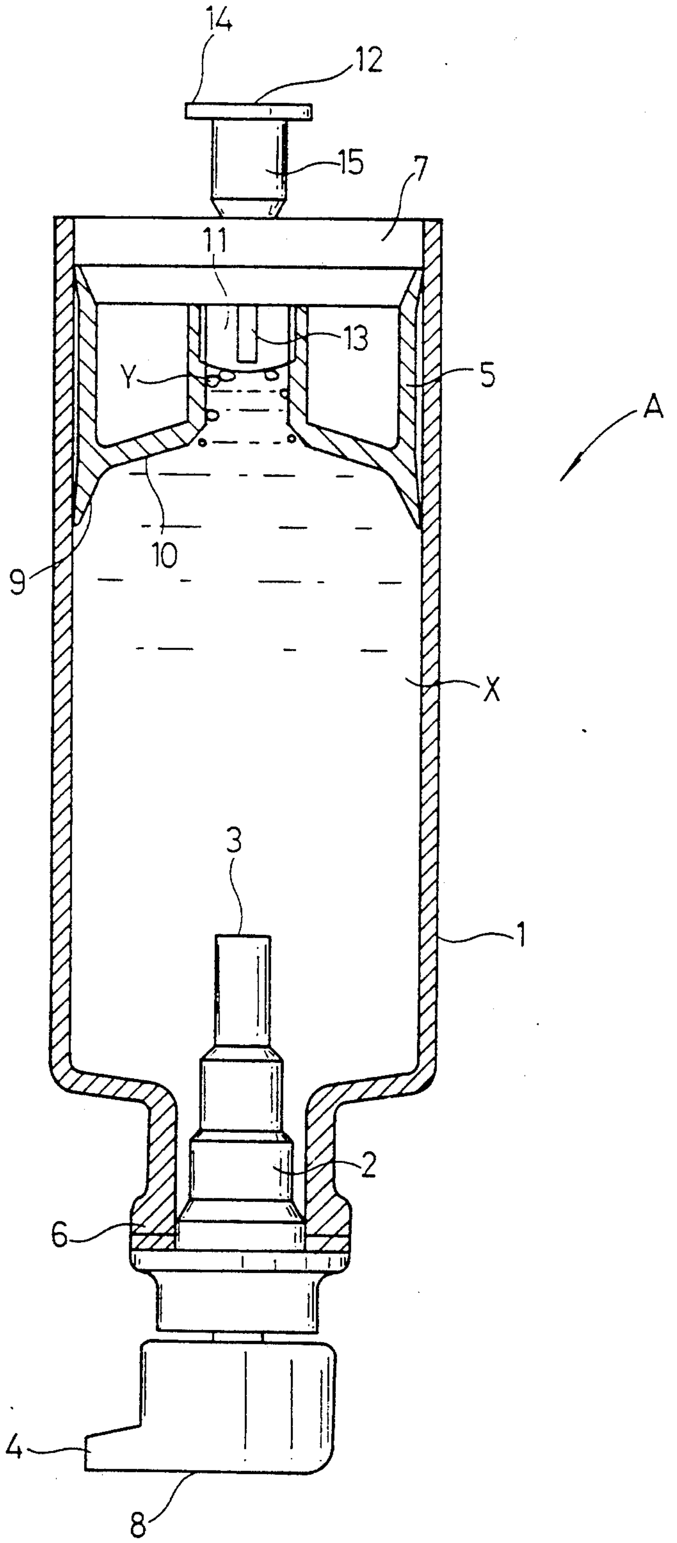
FIG. 2 is a cross-sectional view showing the manner in which a liquid is filled in the combination container and pump shown in FIG. 1.

FIGS. 1 and 2 show a combination container and pump according to an embodiment of the present invention.

As shown in FIG. 1, the combination container and pump, generally denoted at A, comprises a cylindrical container 1 filled with a liquid X such as a chemical solution, a pump 2 mounted in an upper end thereof for drawing the liquid X in the container 1 through an inlet port 3 and discharging the drawn liquid X from an outlet port 4, and a piston 5 slidably fitted in a lower end of the container 1 and sealing the liquid X filled in the container 1, the piston 5 is movable axially in the container 1 toward the pump 2 as the amount of liquid X contained in the container 1 is reduced.

The container 1 has a mount neck 6 substantially centrally in the upper end thereof, and the pump 2 is supported in the mount neck 6. The lower end of the container 1 has a bottom 7 which is open for insertion of the piston 5 thereinto.

With the pump 2 fixedly mounted in the mount neck 6, the inlet port 3 projects into the container 1. The pump 2 has a pressing member 8 which can be pushed by a finger to actuate a pump mechanism (not shown) for thereby drawing the liquid X through the inlet port 3 and discharging the liquid X out of the outlet port 4.

The piston 5, which is slidably disposed in the container 1, has a resilient pressing lip 9 resiliently pressed intimately against the inner wall surface of the container 1. The piston 5 has a slanted surface 10 of an inverted conical shape which is progressively smaller in diameter in the downward direction as shown. The slanted surface 10 faces toward the pump 2 and is held in contact with the liquid X stored in the container 1. The slanted surface 10 extends fully over the end of the piston 5 which faces the pump 2, and converges toward its bottom which has a communication hole 11 defined axially in the piston 5. Through the communication hole 11, the interior and the exterior of the container 1 are held in communication with each other. A cap 12 for sealing the interior of the container 1 is fitted in the communication hole 11 at one end of the piston 5 facing outside of the container 1. The piston 5 has a plurality of axial grooves 13 defined in an inner cylindrical surface thereof which defines the communication hole 11. The axial grooves 13 extend in a direction in which the cap 12 can be inserted into the communication hole 11. The cap 12 has a radially outwardly extending annular flange 14 on the outer rear end of a cap body 15. The flange 14 is held against the outer end of the communication hole 11.

The liquid X can be filled in the container 1 as follows:

As shown in FIG. 2, the bottom 7 of the container 1 is directed upwardly, with the pump 2 directed downwardly. Then, the piston 5 with the cap 12 which is not yet inserted therein is inserted in the bottom 7. The liquid X is now charged into the container 1 through the communication hole 11 in the piston 5. Air bubbles Y, which may have been trapped in the container 1 when the liquid X is introduced into the container 1, move upwardly along the slanted surface 10 into the communication hole 11 because of their buoyancy.

Finally, the cap 12 is inserted into the communication hole 11. As the cap 12 is inserted, the air bubbles Y are discharged out of the container 1 through the grooves 13 defined in the inner cylindrical surface which defines the communication hole 11. The cap 12 is fully inserted in the communication hole 11 until the outer ends of the grooves 13 are closed off by the flange 14, whereupon the container 1 is completely sealed.

Instead of the grooves 13, similar grooves 13a may be defined in the outer cylindrical surface of the cap body 15 which is held against the inner cylindrical surface defining the communication hole 11, as indicated by the imaginary lines in FIG. 1. Alternatively, the grooves 13, 13a may be defined respectively in the inner cylindrical surface of the piston 5 which defines the communication hole 11 and the outer cylindrical surface of the cap body 15.

A combination container and pump according to another embodiment of the present invention will be described with reference to FIGS. 3 and 4.

Figure 3:
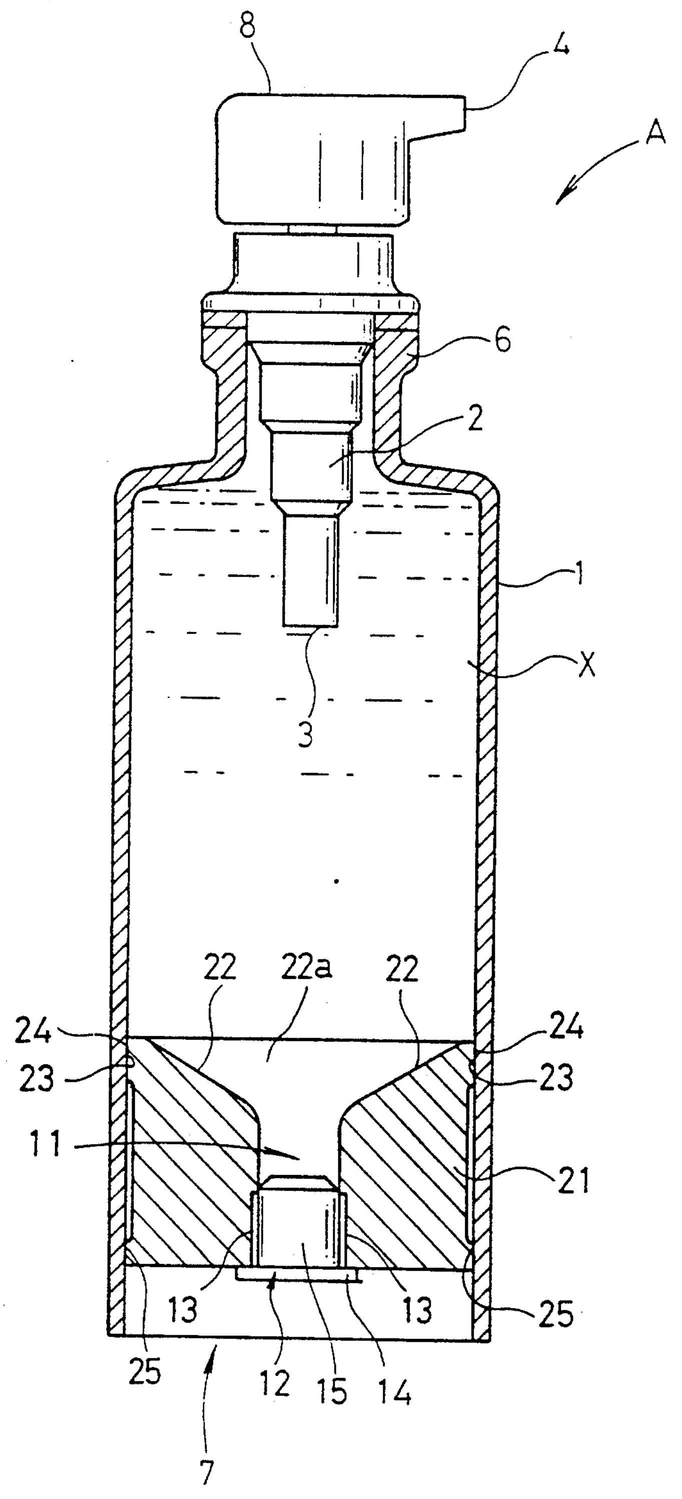
FIG. 3 is a cross-sectional view of a combination container and pump according to another embodiment of the present invention.

As shown in FIG. 3, the combination container and pump, generally denoted at A, has a structure which is basically the same as the structure of the combination container and pump shown in FIGS. 1 and 2. Therefore, those parts shown in FIGS. 3 and 4 which are identical to those shown in FIGS. 1 and 2 are indicated by identical reference numerals, and will not be described in detail.

Figure 4:
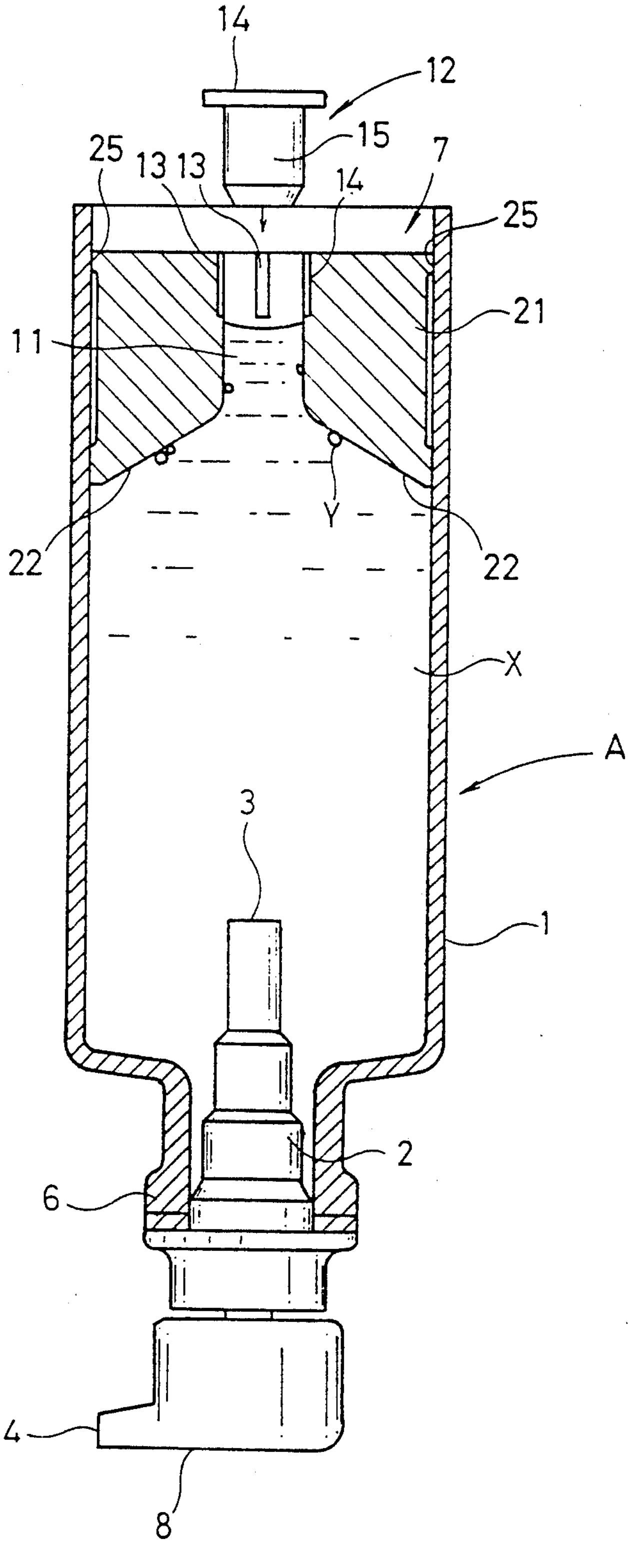
FIG. 4 is a cross-sectional view showing the manner in which a liquid is filled in the combination container and pump shown in FIG. 3.

The combination container and pump shown in FIGS. 3 and 4 differs from the combination container and pump shown in FIGS. 1 and 2 with respect to the structure of the piston.

The piston 21 in FIG. 3 is made of hydrogenated SBS block copolymer, which is a thermoplastic elastomer of a high moldability and chemical resistance. However, the piston 21 may be constructed of any similar sufficiently resilient soft resins.

The piston 21 has a slanted surface 22 facing upwardly in contact with the liquid X in the container 1, the slanted surface 22 defining an inverted conical space 22a which is progressively smaller in diameter in the downward direction. The piston 21 also has an annular ridge 23 projecting radially outwardly and extending fully circumferentially around an upper end of the piston 2a at the larger-diameter end of the slanted surface 22. The annular ridge 23 has an axially flat surface 24 held against the inner wall surface of the container 1. The flat surface 24 allows the piston 21 to slide easily in the container 1 because any excessive elastic deformation of the piston 21 in the radially inward direction is absorbed by the space 22a when the piston 21 is inserted into the container 1. The piston 21 is therefore slidably inserted in the container 1 with the flat surface 24 being held in intimate sliding contact with the inner wall surface of the container 1 under the pressure exerted by the annular ridge 23.

The piston 21 also has, on its lower end, an auxiliary annular ridge 25 projecting radially outwardly and extending fully circumferentially around the piston 21. The annular ridge 25 is substantially identical in shape to the annular ridge 23. When the piston 21 is inserted in the container 1, the ridge 25 as well as the ridge 23 is held intimately against the inner wall surface of the container 1, so that the piston 21 can stably slide axially in the container 1 without undue tilted movement within the container 1. The ridges 23, 25 additionally permit the interior of the container 1 to be more effectively sealed against leakage.

A combination container and pump according to still another embodiment of the present invention will be described below with reference to FIGS. 5 through 7.

Figure 5:
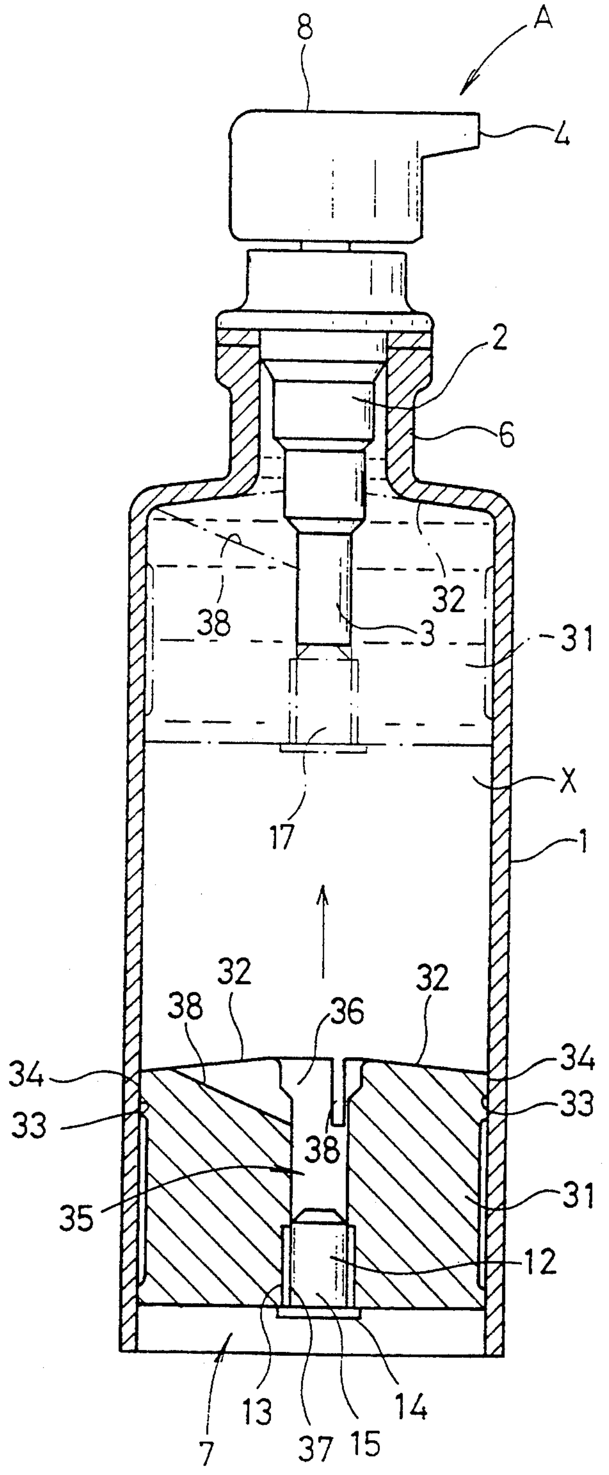
FIG. 5 is a cross-sectional view of a combination container and pump according to still another embodiment of the present invention.

As shown in FIG. 5, the combination container and pump is of a structure which is substantially the same as the structure of the combination container and pump shown in FIGS. 1 and 2. The components shown in FIGS. 5 through 7 which are identical to the components shown in FIGS. 1 and 2 are indicated by identical reference numerals, and will not be described in detail.

Figure 6:
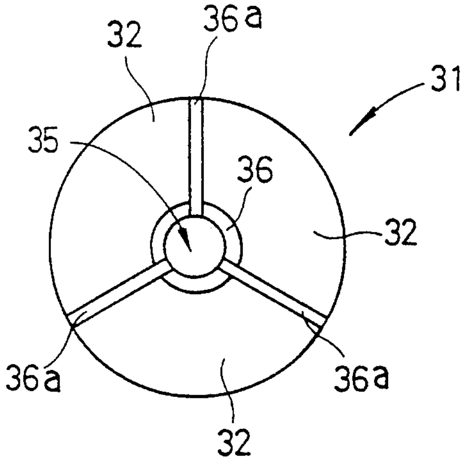
FIG. 6 is a plan view of a piston in the combination container and pump shown in FIG. 5.
Figure 7:
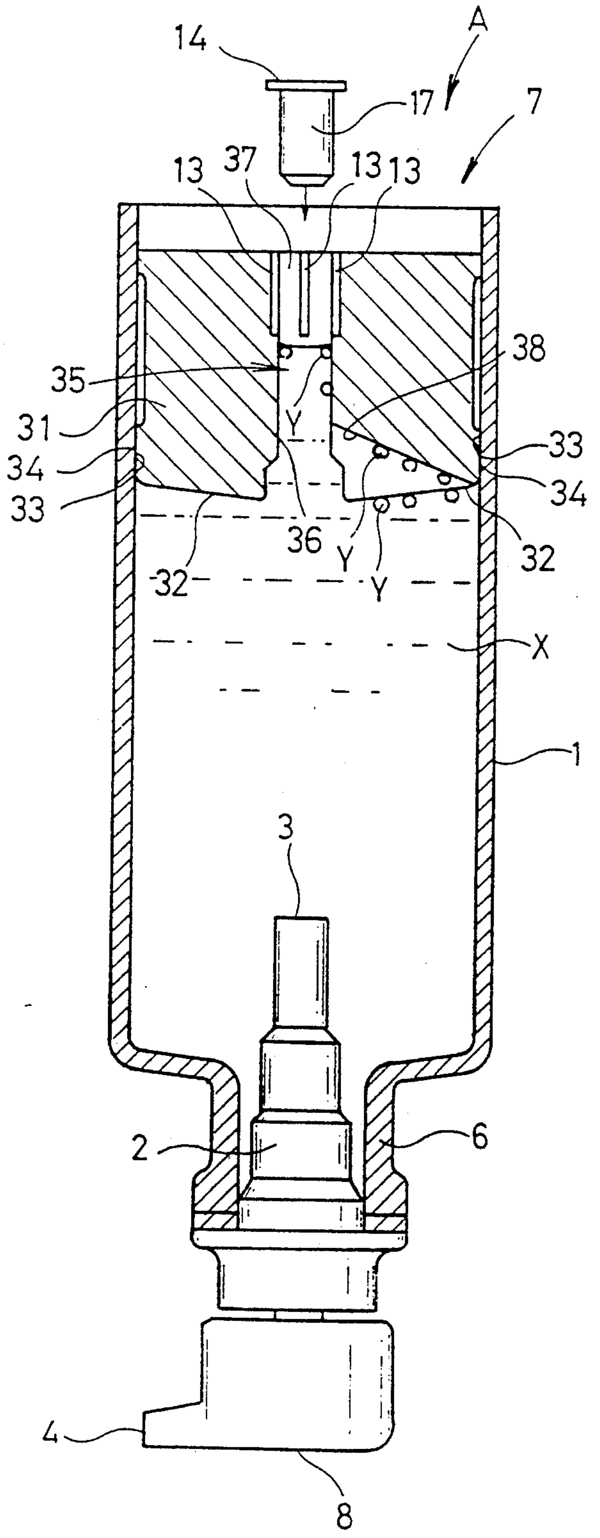
FIG. 7 is a cross-sectional view showing the manner in which a liquid is filled in the combination container and pump shown in FIG. 5.
Figure 8:
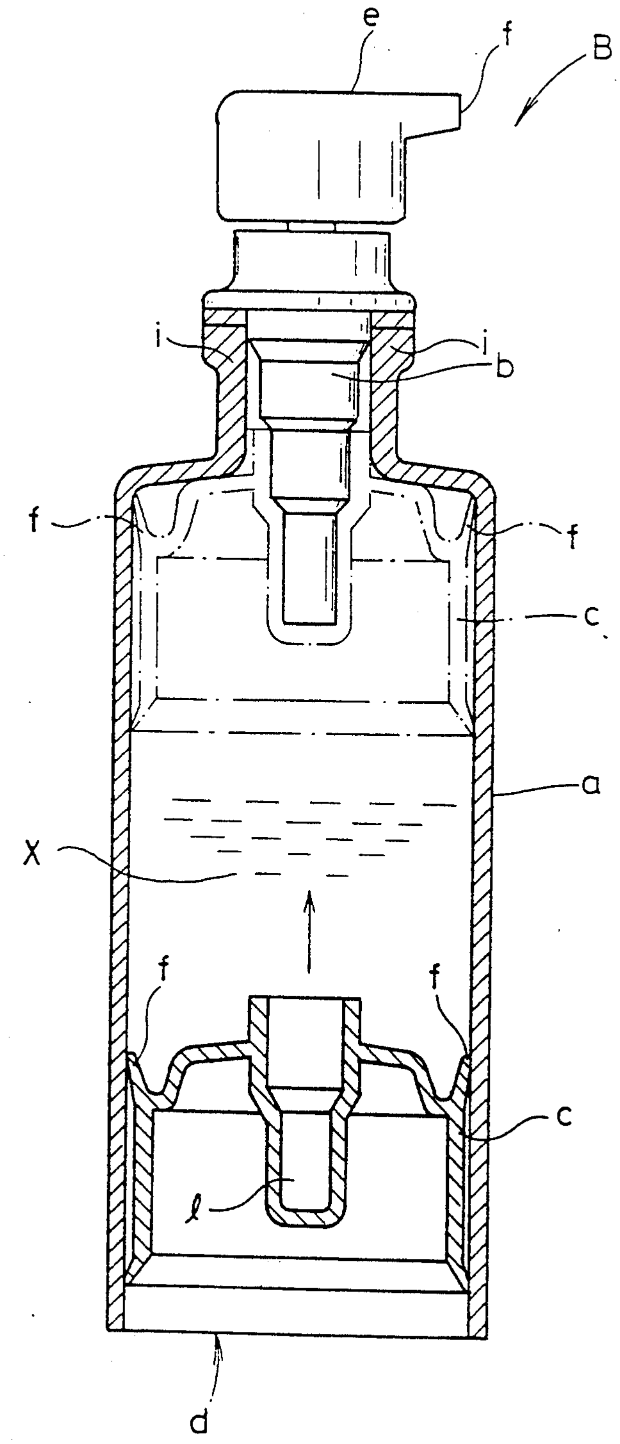
FIG. 8 PRIOR ART
FIG. 8 is a cross-sectional view of a conventional combination container and pump.

The combination container and pump shown in FIGS. 5 through 7 differs from the combination container and pump shown in FIGS. 1 and 2 also with respect to the structure of a piston.

The piston 31 in FIG. 5, is made of a hydrogenated SBS block copolymer, which is a thermoplastic elastomer of a high moldability and chemical resistance, as with the piston 21 according to the preceding embodiment.

The piston 31 has an upper surface 32 facing upwardly (in FIG. 5) in contact with the liquid X in the container 1, the upper surface 32 having a conical shape projecting upwardly in complementary relation to the inner surface of the upper end of the container 1.

The piston 31 also has an annular ridge 33 projecting radially outwardly and extending fully circumferentially around the upper surface 32, the annular ridge 33 having an axially flat surface 34 held against the inner wall surface of the container 1. The flat surface 34 is sufficiently resilient since the material of the piston 31 is a soft resin. The piston 31 is therefore slidably inserted in the container 1 with the flat surface 34 being held in intimate sliding contact with the inner wall surface of the container 1 under the pressure exerted by the annular ridge 23.

The piston 31 has a communication hole 35 defined axially therethrough, thereby providing communication between the interior and the exterior of the container 1. The communication hole 35 is composed of a receiving region 36 for receiving the inlet port 3 of the pump 2 disposed in the container 1, and an introducing region 37 communicating with the receiving region 36 and opening at the lower end of the piston 31, for introducing the liquid X into the container 1.

As shown in FIG. 6, the piston 31 has three equally angularly spaced, radial slots 36a defined therein and extending from the outer circumference of the upper surface 32 toward the communication hole 35. The slots 36a are open at upper portions thereof and have slanted lower surfaces 38 which are progressively inclined downwardly in the radial inward direction, as shown in FIG. 5. When the bottom 7 of the container 1 is directed upwardly as shown in FIG. 7, therefore, the ends of the slanted lower surfaces 38 near the outer circumference of the upper surface 32 are lower in position. With the slots 36a opening at upper portions thereof, the conical upper surface 32 extends partly over the end of the piston 31 which faces the pump 2.

The liquid X can be filled in the container 1 as follows:

As shown in FIG. 7, the bottom 7 of the container 1 is directed upwardly, with the pump 2 directed downwardly. Then, the piston 31 with the cap 12 not yet inserted therein is inserted in the bottom 7. The liquid X is now charged into the container 1 through the communication hole 35 in the piston 5. Air bubbles Y, which may have been trapped in the container 1 when the liquid X is introduced into the container 1, move radially outwardly along the conical upper surface 32 of the piston 31 toward the outer circumference of the upper surface 32. Thereafter, the air bubbles Y move radially inwardly in the slots 36a along the slanted surfaces 38 toward the communication hole 35. The slots 36a may also receive air bubbles which are displaced off the upper surface 32 before they reach the outer circumference of the upper surface 32, and guide the received air bubbles toward the communication hole 35.

Finally, the cap 12 is inserted into the communication hole 35. As the cap 12 is inserted, the air bubbles Y which are collected in the communication hole 35 are discharged out of the container 1 through the grooves 13. The cap 12 is fully inserted in the communication hole 11 until the outer ends of the grooves 13 are closed off by the flange 14, whereupon the container 1 is completely sealed.

The combination container and pump A which is filled with the liquid X, according to the above embodiment, operates in the following manner. When the pressing member 8 of the pump 2 is repeatedly depressed and released by the user, the pump mechanism of the pump 2 is actuated to draw the liquid X through the inlet port 3 and discharge the liquid X through the outlet port 4. As the liquid X is discharged out of the container 1, the amount of the liquid X in the container 1 is progressively reduced, and the piston 31 moves upwardly while keeping the interior of the container 1 sealed as indicated by the imaginary lines in FIG. 5. When the piston 31 reaches the upper end of the container 1, the upper surface 32 of the piston 31 is substantially intimately held against the inner surface of the upper end of the container 1. Therefore, almost the entire amount of the liquid X stored in the container 1 can be discharged from the container 1.

Although certain preferred embodiments have been shown and described, it should be understood that many changes and modifications may be made therein without departing from the scope of the appended claims.

What is claimed is:

1. A combination container and pump comprising:

a cylindrical container for storing a liquid, said cylindrical container having first and second axial ends;

a pump mounted in said first axial end, for drawing the liquid stored in said cylindrical container and discharging the drawn liquid out of said cylindrical container;

a piston slidably disposed in said second axial end for keeping the liquid sealed in said cylindrical container, said piston being movable toward said pump as the amount of the liquid stored in said cylindrical container is reduced when the liquid is discharged from the cylindrical container by said pump;

said piston having a conical surface facing said pump for contact with the liquid stored in said cylindrical container, said conical surface projecting toward said first axial end and having a shape complementary to the shape of an inner surface of said first axial end of said cylindrical container, said piston also having a cylindrical surface defining a communication hole defined axially therethrough and having an inner end opening at said conical surface, said communication hole providing communication between the interior and the exterior of said cylindrical container, said piston having at least one radial slot therein extending from said conical surface to said communication hole, said radial slot having a slanted surface inclined progressively toward said second axial end in a direction opposite to said conical surface; and a cap comprising a cap body inserted in said communication hole and a flange closing an outer end of said communication hole, at least either one of said cap body and said cylindrical surface having at least one groove extending along the direction in which said cap body is inserted into said communication hole.

2. A combination container and pump according to claim 1, wherein said conical surface extends fully over an end thereof which faces said pump.

3. A combination container and pump according to claim 1, wherein said conical surface extends only partly over an end thereof which faces said pump.

4. A combination container and pump according to claim 1, wherein said piston is made of a soft resin, said piston having an annular ridge extending fully circumferentially around said conical surface, said annular ridge having an axially flat surface slidably held against an inner wall surface of said container.

5. A combination container and pump according to claim 1, wherein said communication hole includes a receiving region for receiving an inlet port of said pump therein.

* * * * *